(12) United States Patent
Ryu et al.

(10) Patent No.: US 11,963,172 B2
(45) Date of Patent: Apr. 16, 2024

(54) SIDELINK RESOURCE ALLOCATION AND COMMUNICATION

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Hua Wang, Basking Ridge, NJ (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 17/444,362

(22) Filed: Aug. 3, 2021

(65) Prior Publication Data
US 2022/0046625 A1 Feb. 10, 2022

Related U.S. Application Data

(60) Provisional application No. 63/062,141, filed on Aug. 6, 2020.

(51) Int. Cl.
*H04W 72/00* (2023.01)
*H04W 72/20* (2023.01)

(52) U.S. Cl.
CPC .................................. *H04W 72/20* (2023.01)

(58) Field of Classification Search
CPC .... H04L 1/1854; H04L 1/1896; H04W 72/20; H04W 72/23
See application file for complete search history.

(56) References Cited

U.S. PATENT DOCUMENTS

| | | | | |
|---|---|---|---|---|
| 10,925,039 | B2 * | 2/2021 | Kung | H04W 76/27 |
| 11,470,452 | B2 * | 10/2022 | Ganesan | H04W 4/06 |
| 2017/0353971 | A1 * | 12/2017 | Gupta | H04W 74/04 |
| 2020/0267597 | A1 * | 8/2020 | Huang | H04W 76/14 |
| 2021/0105104 | A1 * | 4/2021 | Cao | H04L 1/1861 |
| 2022/0368461 | A1 * | 11/2022 | Zhang | H04W 72/23 |

* cited by examiner

*Primary Examiner* — Lan-Huong Truong
(74) *Attorney, Agent, or Firm* — Arun Swain

(57) ABSTRACT

This disclosure provides systems, methods, and apparatuses, including computer programs encoded on computer storage media, for wireless communication, including techniques for sidelink resource allocation and communication. In some aspects, a user equipment (UE) may receive from a base station a single message that indicates a first transmission opportunity for transmission of information from the UE to a second UE and that indicates one or more additional transmission opportunities for at least one subsequent transmission of information from the UE to the second UE. The UE may transmit the information to the second UE in the first transmission opportunity. The UE may also retransmit the information to the second UE in at least one of the one or more additional transmission opportunities responsive to the transmission of the information in the first transmission opportunity being unsuccessful. Other aspects and features are also claimed and described.

30 Claims, 7 Drawing Sheets

300

302
RECEIVE, FROM A BASE STATION, A SINGLE MESSAGE THAT INDICATES A FIRST TRANSMISSION OPPORTUNITY FOR TRANSMISSION OF INFORMATION FROM A UE TO A SECOND UE AND THAT INDICATES ONE OR MORE ADDITIONAL TRANSMISSION OPPORTUNITIES FOR AT LEAST ONE SUBSEQUENT TRANSMISSION OF INFORMATION FROM THE UE TO THE SECOND UE

304
TRANSMIT THE INFORMATION TO THE SECOND UE IN THE FIRST TRANSMISSION OPPORTURNITY

306
RETRANSMIT THE INFORMATION TO THE SECOND UE IN AT LEAST ONE OF THE ONE OR MORE ADDITIONAL TRANSMISSION OPPORTUNITIES RESPONSIVE TO THE TRANSMISSION OF THE INFORMATION IN THE FIRST TRANSMISSION OPPORTUNITY BEING UNSUCCESSFUL

SIDELINK RESOURCE ALLOCATION AND COMMUNICATION

CROSS-REFERENCE TO RELATED APPLICATIONS

This application claims the benefit of U.S. Provisional Patent Application No. 63/062,141, entitled, "TECHNIQUES FOR SIDELINK RESOURCE ALLOCATION AND COMMUNICATION," filed on Aug. 6, 2020, which is expressly incorporated by reference herein in its entirety.

TECHNICAL FIELD

Aspects of the present disclosure relate generally to wireless communication, and more particularly, to sidelink resource allocation and communication.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

5G NR communication systems may support sidelink communication. Sidelink communication may refer to communication that is performed directly between one or more UEs. Typically, a base station may provide a first UE with resources that can be used by the first UE for sidelink communication to transmit information directly to a second UE. If the sidelink transmission of information in the base-station-scheduled resources is not successful, the first UE will typically inform the base station of the failed transmission. The base station may respond to the failed transmission indication by providing additional sidelink communication resources that can be used by the first UE to retransmit the information to the second UE. The foregoing communication, between the first UE and the base station regarding sidelink communication resources, performed after each failed sidelink transmission attempt may continue until the first UE successfully transmits the information to the second UE using sidelink communication. This back-and-forth communication between the first UE and the base station regarding sidelink communication resources may reduce the effective data rate, capacity, and spectral efficiency associated with 5G NR wireless communication.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed by a UE is provided. For example, a method can include receiving, from a base station, a single message that indicates a first transmission opportunity for transmission of information from the UE to a second UE and that indicates one or more additional transmission opportunities for at least one subsequent transmission of information from the UE to the second UE. The method also includes transmitting the information to the second UE in the first transmission opportunity. The method can further include retransmitting the information to the second UE in at least one of the one or more additional transmission opportunities responsive to the transmission of the information in the first transmission opportunity being unsuccessful.

In another aspect of the disclosure, a UE configured for wireless communication is provided. For example, the UE can include means for receiving, from a base station, a single message that indicates a first transmission opportunity for transmission of information from the UE to a second UE and that indicates one or more additional transmission opportunities for at least one subsequent transmission of information from the UE to the second UE. The UE can also include means for transmitting the information to the second UE in the first transmission opportunity. The UE can further include means for retransmitting the information to the second UE in at least one of the one or more additional transmission opportunities responsive to the transmission of the information in the first transmission opportunity being unsuccessful.

In an additional aspect of the disclosure, a non-transitory computer-readable medium having program code recorded thereon is provided. The program code can include program code executable by a computer for causing the computer to receive, from a base station, a single message that indicates a first transmission opportunity for transmission of information from a UE to a second UE and that indicates one or more additional transmission opportunities for at least one subsequent transmission of information from the UE to the second UE. The program code can also include program code executable by the computer for causing the computer to initiate transmission of the information to the second UE in the first transmission opportunity. The program code can further include program code executable by the computer for causing the computer to retransmit the information to the second UE in at least one of the one or more additional transmission opportunities responsive to the transmission of the information in the first transmission opportunity being unsuccessful.

In another aspect of the disclosure, a UE is provided. The UE may include at least one processor. The UE may also include at least one memory communicatively coupled with the at least one processor and storing processor-readable code that, when executed by the at least one processor in conjunction with at least one modem, is configured to receive, from a base station, a single message that indicates a first transmission opportunity for transmission of information from the UE to a second UE and that indicates one or more additional transmission opportunities for at least one subsequent transmission of information from the UE to the second UE. The at least one memory may also store processor-readable code that, when executed by the at least one processor in conjunction with the at least one modem, is configured to initiate transmission of the information to the second UE in the first transmission opportunity. The at least one memory may further store processor-readable code that, when executed by the at least one processor in conjunction with the at least one modem, is configured to retransmit the information to the second UE in at least one of the one or more additional transmission opportunities responsive to the transmission of the information in the first transmission opportunity being unsuccessful.

In an additional aspect of the disclosure, a method for wireless communication performed by a base station is provided. For example, a method can include transmitting, to a UE, a single message that indicates a first transmission opportunity for transmission of information from the UE to a second UE and that indicates one or more additional transmission opportunities for at least one subsequent transmission of information from the UE to the second UE. The method can also include, after transmission of the information to the second UE in the first transmission opportunity, receiving, from the UE, an indication as to whether retransmission of the information in the one or more additional transmission opportunities from the UE to the second UE was successful.

In another aspect of the disclosure, a base station configured for wireless communication is provided. For example, the base station can include means for transmitting, to a UE, a single message that indicates a first transmission opportunity for transmission of information from a UE to a second UE and that indicates one or more additional transmission opportunities for at least one subsequent transmission of information from the UE to the second UE. The base station can also include means for, after transmission of the information to the second UE in the first transmission opportunity, receiving, from the UE, an indication as to whether retransmission of the information in the one or more additional transmission opportunities from the UE to the second UE was successful.

In an additional aspect of the disclosure, a non-transitory computer-readable medium having program code recorded thereon is provided. The program code can include program code executable by a computer for causing the computer to transmit, to a UE, a single message that indicates a first transmission opportunity for transmission of information from a UE to a second UE and that indicates one or more additional transmission opportunities for at least one subsequent transmission of information from the UE to the second UE. The program code can also include program code executable by the computer for causing the computer to, after transmission of the information to the second UE in the first transmission opportunity, receive, from the UE, an indication as to whether retransmission of the information in the one or more additional transmission opportunities from the UE to the second UE was successful.

In another aspect of the disclosure, a base station is provided. The base station may include at least one processor. The base station may also include at least one memory communicatively coupled with the at least one processor and storing processor-readable code that, when executed by the at least one processor in conjunction with at least one modem, is configured to transmit, to a UE, a single message that indicates a first transmission opportunity for transmission of information from a UE to a second UE and that indicates one or more additional transmission opportunities for at least one subsequent transmission of information from the UE to the second UE. The at least one memory may further store processor-readable code that, when executed by the at least one processor in conjunction with the at least one modem, is configured to, after transmission of the information to the second UE in the first transmission opportunity, receive, from the UE, an indication as to whether retransmission of the information in the one or more additional transmission opportunities from the UE to the second UE was successful.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
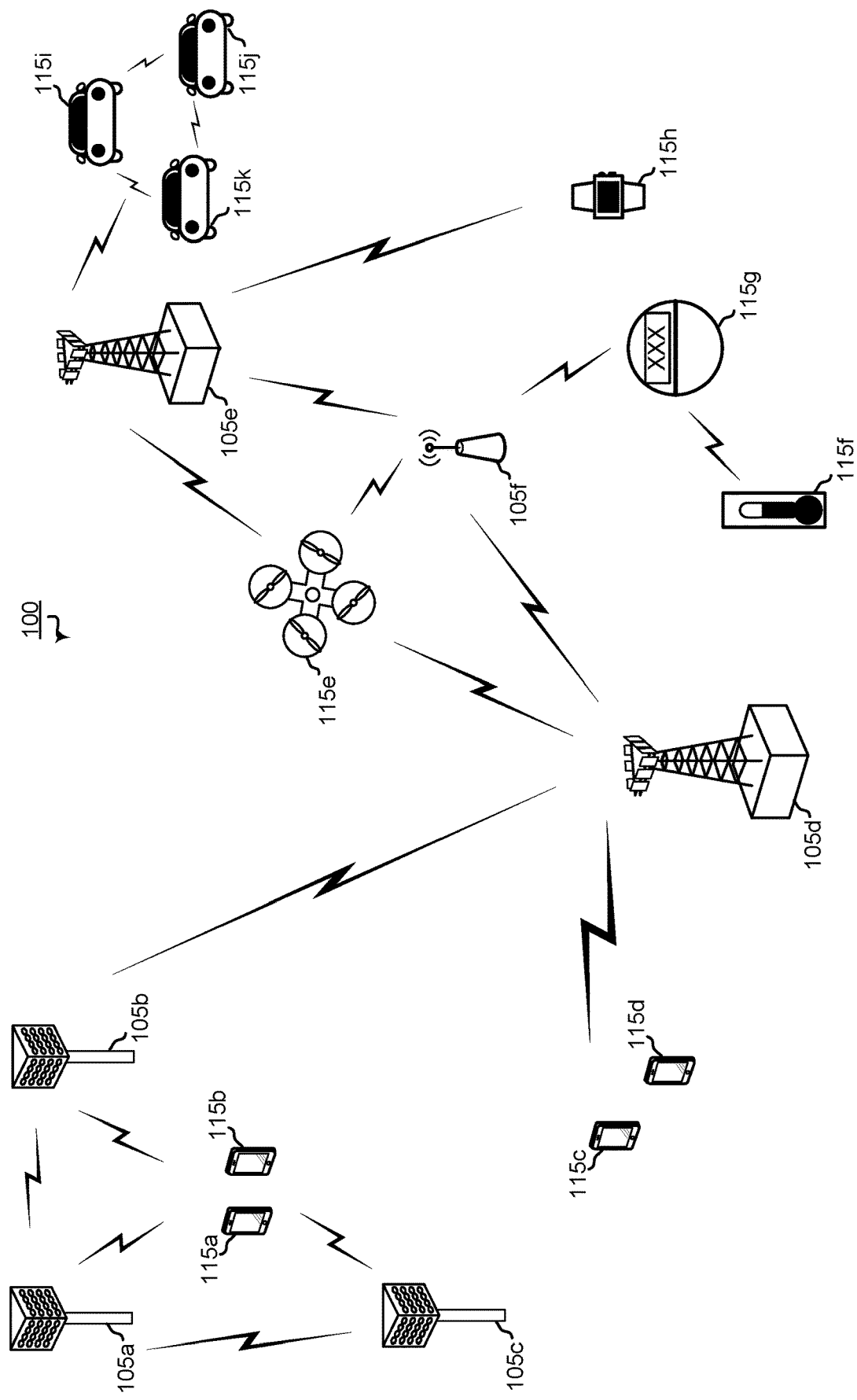
FIG. 1 is a block diagram illustrating details of an example wireless communication system.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Typically, A base station may provide a first UE with resources that can be used by user equipment (UE) for sidelink communication to transmit information directly to another UE. Typically, if the sidelink transmission of information in the base-station-scheduled resources is not successful, the UE will typically inform the base station of the failed transmission and the base station may respond to the failed transmission indication by providing additional sidelink communication resources that can be used by the first UE to retransmit the information to the second UE.

Various aspects of the present disclosure generally relate to sidelink resource allocation and communication. Some aspects more specifically relate to enabling a first UE to perform sidelink communication with a second UE without requiring the first UE to communicate with a base station responsive to a first or initial failed attempt to transmit information to the second UE via sidelink communication. In some aspects, the first UE can obtain additional sidelink resources to use for retransmission of the information to the second UE without additional base station involvement. In some examples, the first UE may receive a single message, such as a grant message, from the base station that indicates both a first sidelink transmission opportunity for transmission of information from the first UE to the second UE and one or more additional sidelink transmission opportunities for at least one subsequent transmission of information from the first UE to the second UE. In some such examples, the first UE may transmit the information in the first transmission opportunity and, if the first UE determines that a first transmission of the information to the second UE in the first transmission opportunity is unsuccessful, the first UE transmits the information to the second UE in at least one of the one or more additional transmission opportunities indicated in the single grant message. In other words, the first UE may not need to communicate with the base station responsive to a failed attempt to transmit the information to the second UE in order to be able to retransmit the information to the second UE because the first UE received, in the original grant message, the indication of the additional sidelink resources that may be used for sidelink retransmission.

Particular aspects of the subject matter described in this disclosure can be implemented to realize one or more of the following potential advantages. In some examples, because the first UE can retransmit the information in the previously-indicated additional sidelink resources without additional base station involvement, the resources that would have otherwise been used by the first UE to communicate with the base station to obtain additional sidelink resources for the retransmission, can instead be advantageously be available used for other purposes, such as uplink communication, downlink communication, sideline communication, as illustrative, non-limiting examples. Additionally, the UE not having to request additional resources responsive to an unsuccessful transmission may result in higher data rates and capacity for regular access link communication between additional resources are not being used enable the first UE with additional sidelink resources to use for retransmissions of information to the second UE. Additionally, the higher data rates and capacity may be achieved a time for the second UE to receive a retransmission of the information may be reduced because the UE does not need to request additional sidelink resources. Aspects of the disclosure may also allow lower power consumption may by the first UE as a result of the reduced communication between the first UE and the base station to coordinate additional resources for the UE responsive to an unsuccessful transmission by the UE in a transmission opportunity.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. In some implementations, two or more wireless communications systems, also referred to as wireless communications networks, may be configured to provide or participate in authorized shared access between the two or more wireless communications systems.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity.

In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
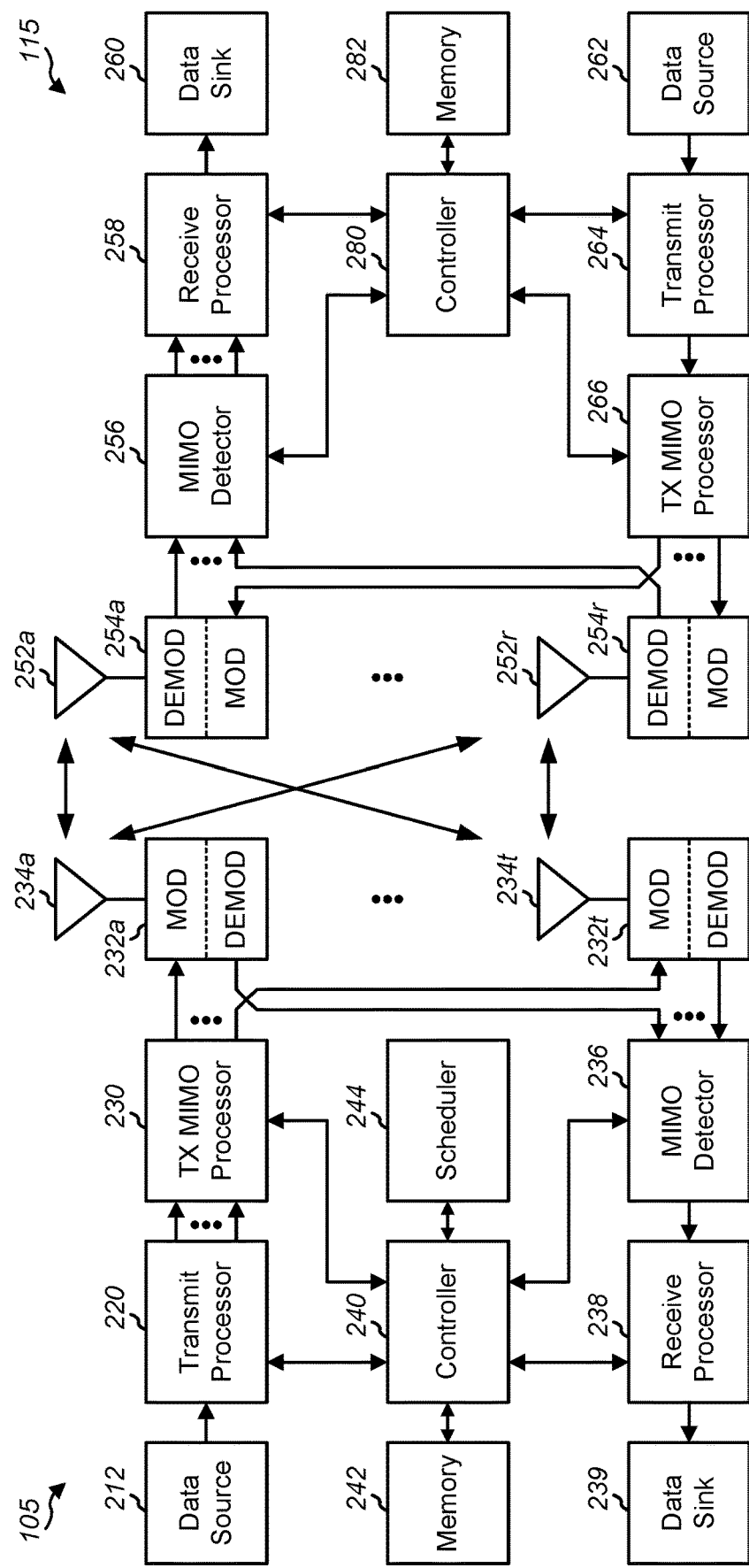
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols.

Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 3 and 5, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

As described above, 5G NR communication systems may support sidelink communication between one or more UEs, such as between a first UE and a second UE. Conventional sidelink communication may be associated with high resource overhead. For example, a first UE desiring to transmit information to a second UE over a sidelink may first need to communicate with a base station to obtain the sidelink resources for use by the first UE to transmit the information to the second UE over the sidelink. If the transmission of information by the first UE to the second UE over the allocated sidelink resources fails, the first UE may need to again communicate with the base station so that the base station may allocate to the first UE additional sidelink resources that the first UE can use to retransmit the information to the second UE. Each time the sidelink transmission fails, the first UE may need to repeat the process of communicating with the base station so that it can be allocated additional sidelink resources to use for retransmission of the information to the second UE. This may result in less-than-optimal sidelink communication.

Aspects of the disclosure may provide enhanced techniques for sidelink resource allocation and communication. For example, in some aspects, techniques disclosed herein may enable a first UE to perform sidelink communication with a second UE without the first UE needing to communicate with a base station after each failed attempt to transmit information to the second UE over the sidelink. In particular, in some aspects, a base station may be configured to allocate to the first UE in an original sidelink grant message sidelink resources for a first transmission of information from the first UE to the second UE and additional sidelink resources that the first UE may use for one or more sidelink retransmissions if the first UE is unable to successfully transmit the information in the first transmission of the information to the second UE. Therefore, the first UE may not need to communicate with the base station after each sidelink transmission failure in order to be able to retransmit the information to the second UE. As a result, aspects of the disclosure may enable enhanced sidelink communication features, including higher data rates, higher capacity, improved spectral efficiency, and lower power consumption.

Figure 3:
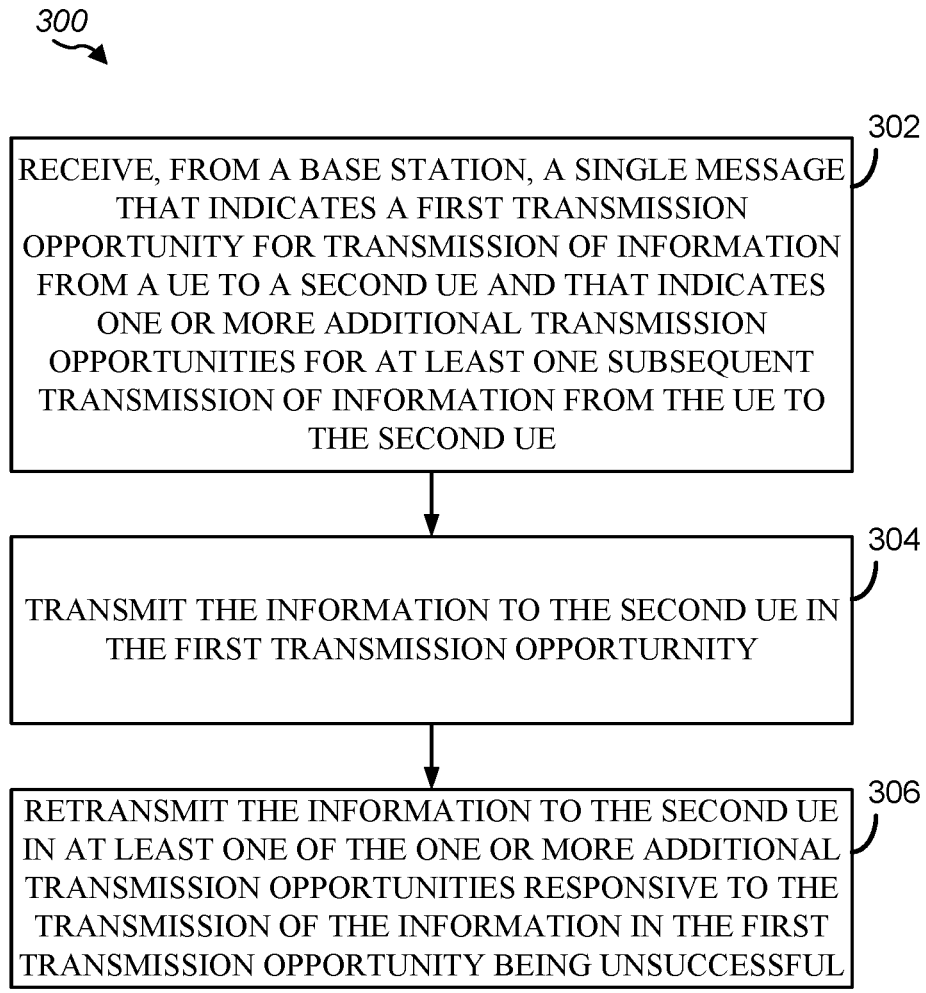
FIG. 3 is a flow diagram illustrating an example process that supports techniques for sidelink resource allocation and communication according to some aspects.

FIG. 3 is a flow diagram illustrating an example process 300 that supports techniques for sidelink resource allocation and communication according to some aspects. Operations of the process 300 may be performed by a UE, such as the UE 115 described above with reference to FIGS. 1 and 2 or a UE as described with reference to FIGS. 4 and 6. For example, with reference to FIG. 2, the controller 280 of the UE 115 may control the UE 115 to perform the process 300.

At block 302, the UE receives, from a base station (such as the base station 105, also referred to as a gNB), a single message that indicates a first transmission opportunity for transmission of information from the UE to a second UE and that indicates one or more additional transmission opportunities for at least one subsequent transmission of information from the UE to the second UE. At block 304, the UE transmits the information to the second UE in the first transmission opportunity. At block 306, the UE retransmits the information to the second UE in at least one of the one or more additional transmission opportunities responsive to the transmission of the information in the first transmission opportunity being unsuccessful. Although described as separate actions at block 304 and block 306, in some implementations, the UE may retransmit the information to the second UE in at least one of the one or more additional transmission opportunities based on the first transmission of the information in the first transmission opportunity being unsuccessful. In some implementations, the UE may determine that the first transmission of the information in the first transmission opportunity was unsuccessful. The actions shown at blocks 302 through 306, as well as the actions shown at blocks 502 and 504 of a process 500 (described below), may be a subset of the overall operations performed by a UE or a base station to achieve enhanced sidelink resource allocation and communication. The relationship between the actions shown at blocks 302 through 306, the actions shown at blocks 502 and 504 of the process 500, and other operations that are performed by a UE or a base station to achieve enhanced sidelink resource allocation and communication may become more evident from a discussion of the overall operations performed by a UE or base station to achieve enhanced sidelink resource allocation and communication.

Figure 4:
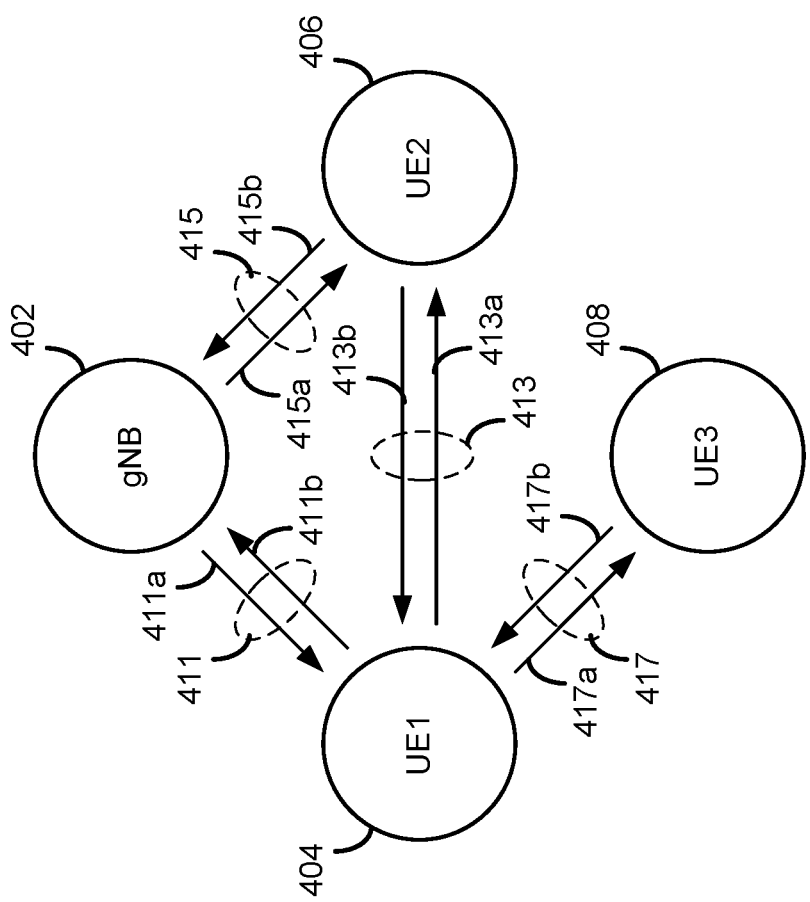
FIG. 4 is a block diagram illustrating an example of sidelink resource allocation and communication according to some aspects.

FIG. 4, as an example, shows a block diagram illustrating an example of sidelink resource allocation and communication according to some aspects. FIG. 4 shows a gNB 402 ("gNB", also referred to as a base station), a first UE 404 ("UE1"), a second UE 406 ("UE2"), and a third UE 408 ("UE3"). Communication between the gNB 402 and the first UE 404 is illustrated as gNB-UE1 communication 411 that includes downlink gNB-to-UE1 communication 411a and uplink UE1-to-gNB communication 411b, such as a PUCCH. Sidelink communication between the first UE 404 and the second UE 406 is illustrated as UE1-UE2 sidelink communication 413 that includes UE1-to-UE2 communication 413a and UE2-to-UE1 communication 413b. Communication between the gNB 402 and the second UE 406 is illustrated as gNB-UE2 communication 415 that includes downlink gNB-to-UE2 communication 415a and uplink UE2-to-gNB communication 415b, such as a PUCCH. Sidelink communication between the first UE 404 and the third UE 408 is illustrated as UE1-UE3 sidelink communication 417 that includes UE1-to-UE3 sidelink communication 417a and UE3-to-UE1 sidelink communication 417b. Although FIG. 4 illustrates only three UEs and only one gNB, other wireless communication systems of this disclosure may also include more or less than three UEs and may also include more than one gNB.

In some aspects, the first UE 404 may have information to be transmitted to the second UE 406 via the sidelink communication 413. To obtain resources, such as at least one of frequency or time resources, that can be used to transmit the information to the second UE 406, the first UE 404 may transmit a message to the gNB 402, for example via the uplink UE1-to-gNB communication 411b, requesting that the gNB 402 allocate sidelink resources to the first UE 404. In response, the gNB 402 may transmit a single message, such as the single message shown at block 302 of FIG. 3, to the first UE 404, for example via the downlink gNB-to-UE1 communication 411a, that includes sidelink resources that the first UE 404 can use to transmit the information to the second UE 406. For example, the single message may include an indication of a first transmission opportunity in which the first UE 404 may attempt to transmit the information to the second UE 406. In some aspects, a transmission opportunity may refer to at least one of frequency or time resources that may be used to transmit information. Therefore, the single message may include at least one of frequency or time resources that may be used by the first UE 404 to attempt to transmit information to the second UE 406.

According to some aspects, the single message transmitted from the gNB 402 to the first UE 404, such as the single message shown at block 302 of FIG. 3, may also include an indication of one or more additional transmission opportunities in which the first UE 404 may attempt at least one subsequent transmission of information to the second UE 406. In some aspects, the at least one subsequent transmission of information may include at least one retransmission of the information that the first UE 404 was unable to transmit to the second UE 406 in the first transmission opportunity or may include at least one separate transmission of different additional information, such as information that is different than the information that the first UE 404 transmitted to the second UE 406 in the first transmission opportunity. As a specific example, in one aspect, the indicated additional transmission opportunities may refer to three additional transmission opportunities that are in addition to the first transmission opportunity, while in another aspect the indicated additional transmission opportunities may refer to four additional transmission opportunities. In general, there may be no limit as to how may additional transmission opportunities may be indicated in the single message. According to some aspects, because a transmission opportunity may refer to at least one of frequency or time resources that may be used to transmit information, the single message may also be referred to as including at least one of additional frequency resources or additional time resources that may be used by the first UE 404 to attempt at least one subsequent transmission, such as a retransmission, of information to the second UE 406. In short, the first UE 404 may be configured to receive from the gNB 402 the single message that includes both the indication of a first transmission opportunity in which the first UE 404 may attempt to transmit the information to the second UE 406 and the indication of one or more additional transmission opportunities in which the first UE 404 may attempt at least one subsequent transmission of information to the second UE 406, as shown at block 302 of FIG. 3.

In some aspects, the gNB 402 may also transmit a single message to the second UE 406, for example via downlink the gNB-to-UE2 communication 415*a*. According to some aspects, the single message transmitted by the gNB 402 to the second UE 406 may indicate a first reception opportunity for reception of information by the second UE 406 from the first UE 404. The single message transmitted by the gNB 402 to the second UE 406 may also indicate one or more additional reception opportunities for at least one subsequent reception of the information by the second UE 406 from the first UE 404. For example, the single message transmitted by the gNB 402 to the second UE 406 may include an indication of a first reception opportunity in which the second UE 406 may attempt to receive the information from the first UE 404 and an indication of one or more additional reception opportunities in which the second UE 406 may attempt at least one subsequent reception of the information from the first UE 404. In some aspects, because a reception opportunity may refer to at least one of frequency or time resources that may be used to receive information, the single message may be referred to as including at least one of frequency or time resources that may be used by the second UE 406 to attempt to receive information from the first UE 404. In additional aspects, the single message may also be referred to as including at least one of additional frequency resources or additional time resources that may be used by the second UE 406 to attempt at least one subsequent reception of information from the first UE 404.

In some aspects, the first reception opportunity may be associated with the first transmission opportunity and the one or more additional reception opportunities may be associated with the one or more additional transmission opportunities. For example, at least one of the frequency or time resources associated with the first reception opportunity may overlap with at least one of the frequency or time resources associated with the first transmission opportunity. Similarly, at least one of the frequency or time resources associated with the one or more additional reception opportunities may overlap with at least one of the frequency or time resources associated with the one or more additional transmission opportunities.

According to some aspects, the first UE 404 may attempt a first transmission of the information to the second UE 406 in the first transmission opportunity, for example via the UE1-to-UE2 sidelink communication 413*a*. Similarly, the second UE 406 may attempt to receive information from the first UE 404 in the first reception opportunity that is associated with the first transmission opportunity.

In some aspects, the first UE 404 may determine whether the first transmission of the information to the second UE 406 in the first transmission opportunity was successful or unsuccessful. According to some aspects, the first UE 404 may determine that the first transmission of the information to the second UE 406 in the first transmission opportunity was successful when the first UE 404 receives a positive acknowledgment from the second UE 406, for example via the UE2-to-UE1 sidelink communication 413*b*. For example, the positive acknowledgement may indicate to the first UE 404 that the second UE 406 successfully received the information from the first UE 404 in the first transmission opportunity.

According to some aspects, the first UE 404 may determine that the first transmission of the information to the second UE 406 in the first transmission opportunity was unsuccessful, such as at block 304 of FIG. 3. In some aspects, the first UE 404 may determine that the first transmission of the information to second UE 406 in the first transmission opportunity was unsuccessful when the first UE 404 receives a negative acknowledgment from the second UE 406, for example via the UE2-to-UE1 sidelink communication 413*b*. For example, the negative acknowledgement may indicate to the first UE 404 that the second UE 406 was not able to receive the information from the first UE 404 in the first transmission opportunity. According to additional aspects, the first UE 404 may determine that the first transmission of the information to the second UE 406 in the first transmission opportunity was unsuccessful when the first UE 404 does not receive a positive acknowledgment or a negative acknowledgement from the second UE 406.

In some aspects, the first UE 404 may retransmit the information to the second UE 406 in at least one of the one or more additional transmission opportunities, for example as shown at block 306 of FIG. 3. For example, the first UE 404 may retransmit the information to the second UE 406 via the UE1-to-UE2 sidelink communication 413*a*. According to some aspects, the first UE 404 may retransmit the information to the second UE 406 in at least one of the one or more additional transmission opportunities based on, or responsive to, a determination that the first transmission of the information to the second UE 406 in the first transmission opportunity was unsuccessful, such as at block 304 of FIG. 3.

According to some aspects, the first UE 404 may retransmit the information to the second UE 406 in at least one of the one or more additional transmission opportunities without first communicating with the gNB 402 again to obtain additional sidelink resources to use to retransmit the information to the second UE 406. In other words, in some aspects, the first UE 404 may not receive from the gNB 402, after the first transmission opportunity has occurred and before the retransmission of the information in any of the one or more additional transmission opportunities, an indication of the one or more additional transmission opportunities to use for retransmission of the information to the second UE 406. Similarly, according to some aspects, the gNB 402 may not transmit to the first UE 404, after the first transmission opportunity has occurred and before the retransmission of the information in any of the one or more additional transmission opportunities, an indication of the one or more additional transmission opportunities to use for retransmission of the information.

In some aspects, the first UE 404 may transmit an indication to the gNB 402 as to whether a retransmission of the information to the second UE 406 was successful, for example via the uplink UE1-to-gNB communication 411*b*. According to some aspects, the first UE 404 may transmit to the gNB 402, and the gNB 402 may receive from the first UE 404, a positive acknowledgment message to indicate to the gNB 402 that a retransmission of the information to the second UE 406 was successful. In some aspects, the first UE 404 may transmit to the gNB 402, and the gNB 402 may receive from the first UE 404, a negative acknowledgment message to indicate to the gNB 402 that a retransmission of the information to the second UE 406 was unsuccessful.

According to some aspects, the second UE 406 may transmit an indication to the gNB 402 as to whether a retransmission of the information to the second UE 406 was successful, for example via the uplink UE2-to-gNB communication 415*b*. According to some aspects, the second UE 406 may transmit to the gNB 402, and the gNB 402 may receive from the second UE 406, a positive acknowledgment message to indicate to the gNB 402 that a retransmission of the information to the second UE 406 was successful. In some aspects, the second UE 406 may transmit to the gNB 402, and the gNB 402 may receive from the second UE 406, a negative acknowledgment message to indicate to the gNB 402 that a retransmission of the information to the second UE 406 was unsuccessful. In general, in some aspects, the gNB 402 may assume that a retransmission of the information from the first UE 404 to the second UE 406 was unsuccessful if the gNB 402 does not receive a positive acknowledgment from the first UE 404 or from second UE 406.

In some aspects, at least one of the first UE 404 or the second UE 406 may transmit to the gNB 402 the indication as to whether a retransmission of the information from the first UE 404 to the second UE 406 was successful after each respective transmission opportunity of the one or more additional transmission opportunities has occurred. Similarly, the gNB 402 may receive, from at least one of the first UE 404 or the second UE 406, the indication as to whether a retransmission of the information from the first UE 404 to the second UE 406 was successful after each respective transmission opportunity of the one or more additional transmission opportunities has occurred.

According to some aspects, at least one of the first UE 404 or the second UE 406 may transmit to the gNB 402 the indication as to whether a retransmission of the information from the first UE 404 to the second UE 406 was successful after a group of transmission opportunities of the one or more additional transmission opportunities has occurred. Similarly, the gNB 402 may receive, from at least one of the first UE 404 or the second UE 406, the indication as to whether a retransmission of the information from the first UE 404 to the second UE 406 was successful after a group of transmission opportunities of the one or more additional transmission opportunities has occurred. For example, at least one of the first UE 404 or the second UE 406 may transmit to the gNB 402 the indication as to whether a retransmission of the information from the first UE 404 to the second UE 406 was successful after every other or after every third subsequent transmission opportunity has occurred.

According to some aspects, at least one of the first UE 404 or the second UE 406 may transmit to the gNB 402 the indication as to whether a retransmission of the information from the first UE 404 to the second UE 406 was successful after all of the one or more additional transmission opportunities have occurred. Similarly, the gNB 402 may receive, from at least one of the first UE 404 or the second UE 406, the indication as to whether a retransmission of the information from the first UE 404 to the second UE 406 was successful after all of the one or more additional transmission opportunities have occurred.

In some aspects, the gNB 402 may inform at least one of the first UE 404 or the second UE 406 as to when they should provide an indication as to whether a retransmission of the information from the first UE 404 to the second UE 406 was successful. For example, the gNB 402 may transmit to at least one of the first UE 404 or the second UE 406, and at least one of the first UE 404 or the second UE 406 may receive from the gNB 402, an indication as to whether a success of a retransmission of the information from the first UE 404 to the second UE 406 is to be indicated after each respective transmission opportunity of the one or more additional transmission opportunities has occurred, after a group of transmission opportunities of the one or more additional transmission opportunities has occurred, or after all of the one or more additional transmission opportunities have occurred. In some aspects, such an indication from the gNB 402 may be included in at least one of the single message transmitted to the first UE 404 or the single message transmitted to the second UE 406.

According to some aspects, at least one of the first UE 404 or the second UE 406 may not transmit the indication as to whether retransmission of the information was successful during a time period after the first transmission opportunity and before the retransmission of the information in any of the one or more additional transmission opportunities. Similarly, according to some aspects, the gNB 402 may not receive the indication during a time period after the first transmission opportunity and before a retransmission of the information in any of the one or more additional transmission opportunities. In other words, the first UE 404 may proceed directly to attempting to retransmit the information to the second UE 406 in at least one of the one or more additional transmission opportunities without first communicating with the gNB 402 again, for example to obtain additional sidelink resources to use to retransmit the information to the second UE 406.

In some aspects, some of the one or more additional transmission opportunities (or associated reception opportunities) may no longer be needed to transmit (or receive) the originally-scheduled information from the first UE 404 to the second UE 406 after a successful first transmission of information in the first transmission opportunity or after a successful retransmission of the information in at least one of the one or more additional transmission opportunities. As one specific example in an aspect of the disclosure in which the single message transmitted by the gNB 402 to at least one of the first UE 404 or the second UE 406 indicates three additional transmission opportunities, the second and third additional transmission opportunities, for example the last two additional transmission opportunities, may no longer be needed to transmit originally-scheduled information from the first UE 404 to the second UE 406 after a successful first transmission of information in the first transmission opportunity or after a successful retransmission of the information in the first additional transmission opportunity after the first transmission opportunity. As a result, the last two additional transmission opportunities may not be used to retransmit the information from the first UE 404 to the second UE 406.

In some aspects, the first UE 404 may not transmit additional information to the second UE 406 in at least one of the one or more additional transmission opportunities not used to retransmit the information from the first UE 404 to the second UE 406. As a result, the at least one of the one or more additional transmission opportunities not used to retransmit the information from the first UE 404 to the second UE 406 may become inactive.

In some aspects, based on communication between the first UE 404 and the gNB 402, for example via the gNB-UE1 communication 411, the first UE 404 may allow at least one of the one or more additional transmission opportunities not used to retransmit the information from the first UE 404 to the second UE 406 to become inactive or may refrain from transmitting information in at least one of the one or more additional transmission opportunities not used to retransmit the information from the first UE 404 to the second UE 406. For example, according to some aspects, the first UE 404 may transmit an indication to the gNB 402 that retransmission of the information to the second UE 406 was successful. In some aspects, the first UE 404 may refrain from transmitting additional information to the second UE 406 in at least one of the one or more additional transmission opportunities not used to retransmit the information to the second UE 406 based on the transmission of the indication to the gNB 402 that retransmission of the information to the second UE 406 was successful. For example, in some aspects, in response to the success indication transmitted to the gNB 402, the first UE 404 may receive from the gNB 402, and the gNB 402 may transmit to the first UE 404, an indication that at least one of the one or more additional transmission opportunities not used to retransmit the information to the second UE 406 are no longer available for use by the first UE 404. According to some aspects, the first UE 404 may refrain from transmitting additional information to the second UE 406 in at least one of the one or more additional transmission opportunities not used to retransmit the information to the second UE 406 based on the reception of the indication that at least one of the one or more additional transmission opportunities not used to retransmit the information to the second UE 406 are no longer available for use by the first UE 404.

In some aspects, the first UE 404 may also transmit sidelink control information (SCI) to the second UE 406, for example via the UE1-to-UE2 sidelink communication 413a. According to some aspects, the SCI may include an indication of the first transmission opportunity in which the first UE 404 may attempt to transmit the information to the second UE 406. In some aspects, the SCI may also include an indication of the one or more additional transmission opportunities in which the first UE 404 may attempt at least one subsequent transmission of information to the second UE 406. In additional aspects, the SCI may also include an indication that the first UE 404 may not transmit additional information to the second UE 406 in at least one of the one or more additional transmission opportunities not used to retransmit the information to the second UE 406, for example after a successful first transmission of information in the first transmission opportunity or after a successful retransmission of the information in at least one of the one or more additional transmission opportunities.

In some aspects, the first UE 404 may transmit additional information to the second UE 406, for example via the UE1-to-UE2 sidelink communication 413a, using at least one of the one or more additional transmission opportunities not used to retransmit information to the second UE 406, for example not used because there was a successful first transmission of information in the first transmission opportunity or in at least one of the one or more additional transmission opportunities. According to some aspects, the first UE 404 may transmit to the second UE 406 control information that indicates how at least one of the one or more additional transmission opportunities not used to retransmit the information to the second UE 406 will be used to transmit additional information. For example, such control information may be included in the SCI transmitted from the first UE 404 to the second UE 406. According to some aspects, the first UE 404 may transmit the SCI to the second UE 406 in at least another one of the one or more additional transmission opportunities not used to retransmit the information to the second UE 406. For example, the first UE 404 may transmit the SCI to the second UE 406 in the first additional transmission opportunity, of the one or more additional transmission opportunities, that immediately follows the additional transmission opportunity in which information from the first UE 404 was successfully retransmitted to the second UE 406. In some aspects, after transmitting the SCI to the second UE 406, the first UE 404 may transmit to the second UE 406, for example via the UE1-to-UE2 sidelink communication 413a, additional information in at least one of the one or more additional transmission opportunities not used to retransmit the information to the second UE 406. Such transmission by the first UE 404 of additional information to the second UE 406 may be performed in accordance with the SCI transmitted by the first UE 404 to the second UE 406.

According to some aspects, the SCI transmitted from the first UE 404 to the second UE 406 may also indicate that at least one of the one or more additional transmission opportunities not used to retransmit information from the first UE 404 to the second UE 406 will be used to receive information from the second UE 406. For example, after transmitting the SCI to the second UE 406, the first UE 404 may receive from the second UE 406, for example via the UE2-to-UE1 sidelink communication 413b, information in at least one of the one or more additional transmission opportunities not used to retransmit the information to the second UE 406. Such reception by the first UE 404 of information from the second UE 406 may be performed in accordance with the SCI transmitted by the first UE 404 to the second UE 406.

In some aspects, the first UE 404 may transmit additional information to one or more UEs other than the second UE 406 using at least one of the one or more additional transmission opportunities not used to retransmit information to the second UE 406. For example, the first UE 404 may use at least one of the one or more additional transmission opportunities not used to retransmit information to the second UE 406 to transmit additional information to one or more UEs reachable by the first UE 404 using a same transmission beam used to transmit information to the second UE 406. As one example with respect to FIG. 4, the third UE 408 may be a UE other than the second UE 406, such as a UE reachable by the first UE 404 using a same transmission beam used to transmit information to the second UE 406. The first UE 404 may transmit additional information to the third UE 408, for example via the UE1-to-UE3 sidelink communication 417a, using at least one of the one or more additional transmission opportunities not used to retransmit information to the second UE 406. For example, the first UE 404 may transmit to the third UE 408, for example via the UE1-to-UE3 sidelink communication 417*a*, SCI that indicates how at least one of the one or more additional transmission opportunities not used to retransmit the information to the second UE 406 will be used to transmit additional information to the third UE 408. In some aspects, after transmitting the SCI to the third UE 408, the first UE 404 may transmit to the third UE 408, for example via the UE1-to-UE3 sidelink communication 417*a*, additional information in at least one of the one or more additional transmission opportunities not used to retransmit the information to the second UE 406. Such transmission by the first UE 404 of additional information to the third UE 408 may be performed in accordance with the SCI transmitted by the first UE 404 to the third UE 408. As shown, in some aspects, the first UE 404 may be configured to use at least one of the one or more additional transmission opportunities not used to retransmit the information to the second UE 406 to transmit additional information to at least one of the second UE 406, one or more UEs other than the first UE 404 and the second UE 406, or one or more UEs reachable by the first UE 404 using a same transmission beam used to transmit information to the second UE 406.

According to some aspects, the SCI transmitted from the first UE 404 to the third UE 408 may also indicate that at least one of the one or more additional transmission opportunities not used to retransmit information from the first UE 404 to the second UE 406 will be used to receive information from the third UE 408. For example, after transmitting the SCI to the third UE 408, the first UE 404 may receive from the third UE 408, for example via the UE3-to-UE1 sidelink communication 417*b*, information in at least one of the one or more additional transmission opportunities not used to retransmit the information to the second UE 406. Such reception by the first UE 404 of information from the third UE 408 may be performed in accordance with the SCI transmitted by the first UE 404 to the third UE 408.

Figure 5:
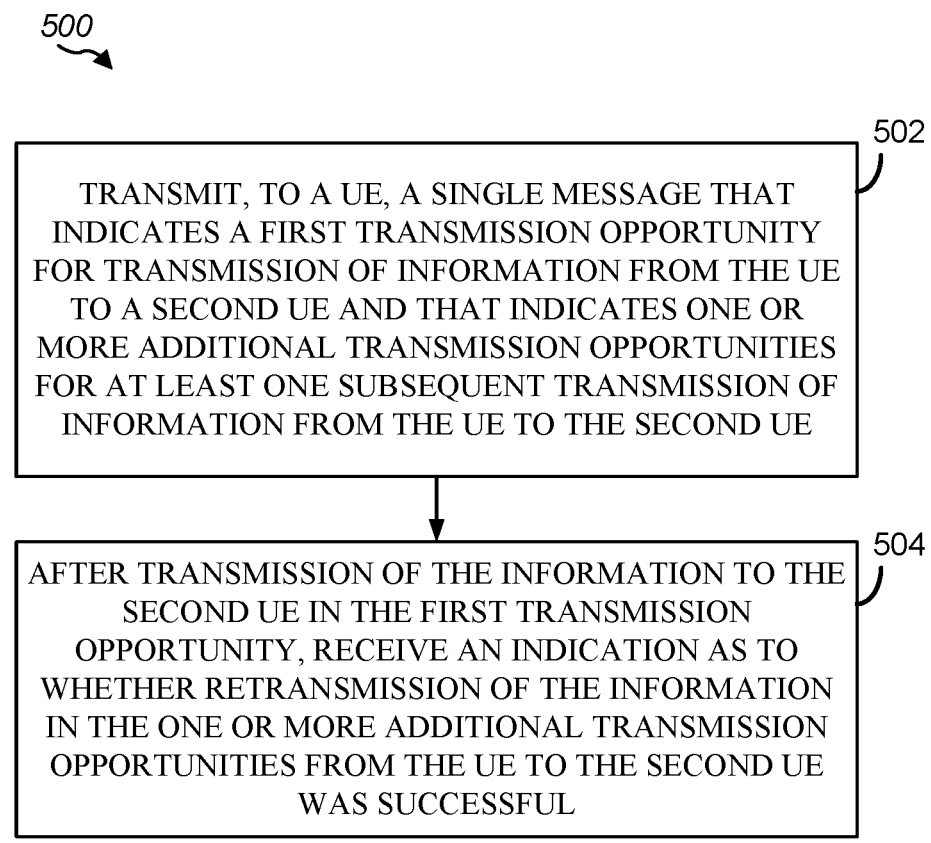
FIG. 5 is another flow diagram illustrating an example process that supports techniques for sidelink resource allocation and communication according to some aspects.

FIG. 5 is another flow diagram illustrating an example process 500 that supports techniques for sidelink resource allocation and communication according to some aspects. Operations of process 500 may be performed by a base station or gNB, such as the base station 105 described above with reference to FIGS. 1-2 or a base station or gNB as described with reference to FIGS. 4 and 7. For example, with reference to FIG. 2, the controller 240 of the base station 105 may control the base station 105 to perform the process 500. At block 502, the base station transmits, to a UE, a single message that indicates a first transmission opportunity for transmission of information from the UE to a second UE and that indicates one or more additional transmission opportunities for at least one subsequent transmission of information from the UE to the second UE. At block 504, the base station, after transmission of the information to the second UE in the first transmission opportunity, receives, from the UE, an indication as to whether retransmission of the information in the one or more additional transmission opportunities from the UE to the second UE was successful.

Figure 6:
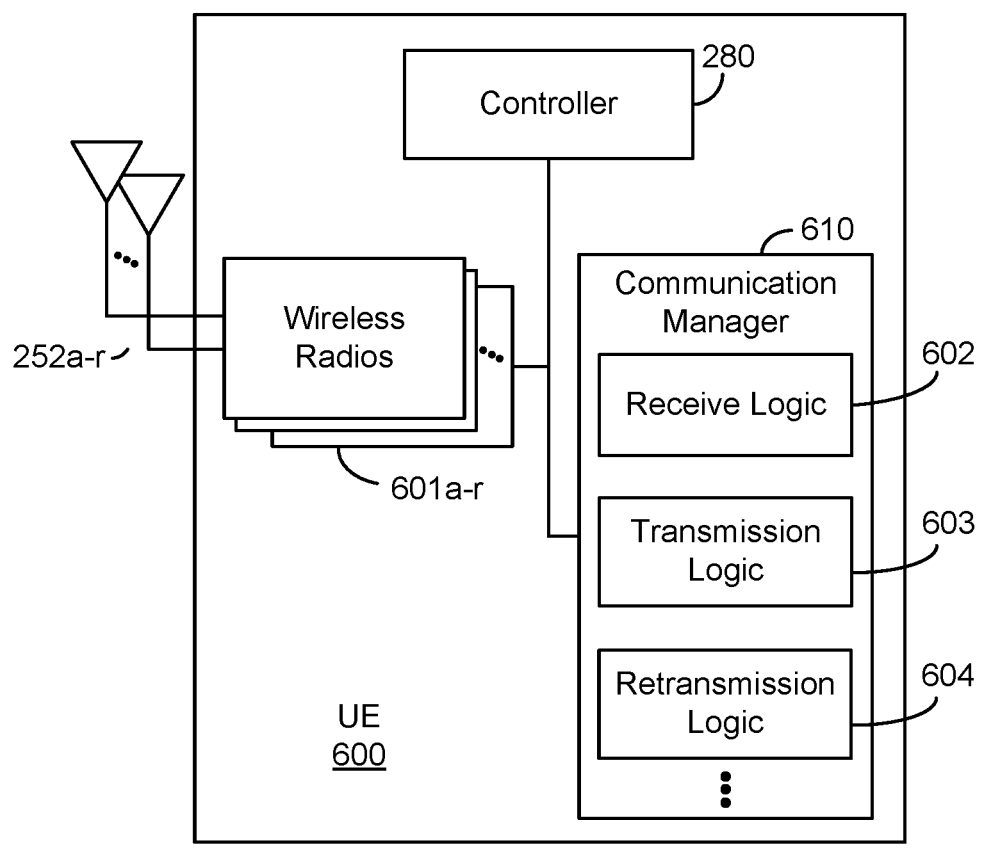
FIG. 6 is a block diagram of an example UE that supports techniques for sidelink resource allocation and communication according to some aspects.

FIG. 6 is a block diagram of an example UE 600 that supports techniques for sidelink resource allocation and communication according to some aspects. UE 600 may be configured to perform operations, including the blocks of the process 300 described with reference to FIG. 3. In some implementations, the UE 600 includes the structure, hardware, and components shown and described with reference to the UE 115 of FIG. 1 or 2. For example, the UE 600 includes the controller 280, which operates to execute logic or computer instructions illustrated in communication manager 610, as well as controlling the components of the UE 600 that provide the features and functionality of the UE 600. The UE 600, under control of the controller 280, transmits and receives signals via wireless radios 601*a-r* and the antennas 252*a-r*. The wireless radios 601*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

The communication manager 610 may include receive logic 602, transmission logic 603, and retransmission logic 604. Portions of one or more of the components 602, 603, and 604 may be implemented at least in part in hardware or software. In some implementations, at least one of the components 602, 603, and 604 is implemented at least in part as software stored in a memory (such as the memory 282). For example, portions of one or more of the components 602, 603, and 604 can be implemented as non-transitory instructions or code executable by a processor (such as the controller 280) to perform the functions or operations of the respective component.

One or more of the components 602, 603, and 604 illustrated in the communication manager 610 may configure the controller 280 to carry out one or more procedures relating to wireless communication by the UE 600, as previously described. For example, the receive logic 602 may configure the controller 280 to carry out operations that include receiving, from a base station, a single message that indicates a first transmission opportunity for transmission of information from the UE 600 to a second UE and that indicates one or more additional transmission opportunities for at least one subsequent transmission of information from the UE 600 to the second UE in any manner previously described, such as with reference to block 302 of FIG. 3. Additionally, the transmission logic 603 may configure the controller 280 to carry out operations that include transmitting the information to the second UE in the first transmission opportunity in any manner previously described, such as with reference to block 304 of FIG. 3. Additionally, the retransmission logic 604 may configure the controller 280 to carry out operations that include retransmitting the information to the second UE in at least one of the one or more additional transmission opportunities responsive to the transmission of the information in the first transmission opportunity being unsuccessful in any manner previously described, such as with reference to block 306 of FIG. 3. The UE 600 may receive signals from or transmit signals to one or more network entities, such as the base station 105 of FIGS. 1-2, the gNB 402 of FIG. 4, or a base station as illustrated in FIG. 7.

Figure 7:
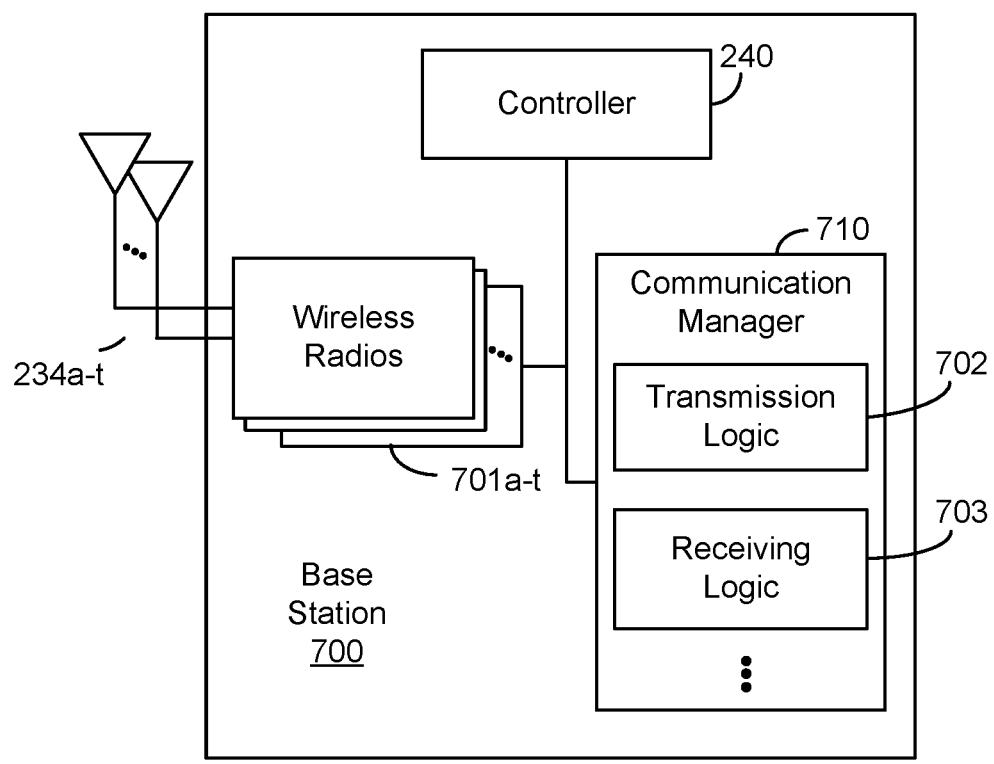
FIG. 7 is a block diagram of an example base station that supports techniques for sidelink resource allocation and communication according to some aspects.

FIG. 7 is a block diagram of an example base station 700 that supports techniques for sidelink resource allocation and communication according to some aspects. The base station 700 may be configured to perform operations, including the blocks of the process 500 described with reference to FIG. 5. In some implementations, the base station 700 includes the structure, hardware, and components shown and described with reference to the base station 105 of FIGS. 1-2 or the gNB 402 of FIG. 4. For example, the base station 700 may include the controller 240, which operates to execute logic or computer instructions illustrated in communication manager 710, as well as controlling the components of the base station 700 that provide the features and functionality of the base station 700. The base station 700, under control of the controller 240, transmits and receives signals via wireless radios 701a-t and the antennas 234a-t. The wireless radios 701a-t include various components and hardware, as illustrated in FIG. 2 for the base station 105, including the modulator and demodulators 232a-t, the transmit processor 220, the TX MIMO processor 230, the MIMO detector 236, and the receive processor 238.

The communication manager 710 may include transmission logic 702 and receive logic 703. Portions of one or more of the components 702 and 703 may be implemented at least in part in hardware or software. In some implementations, at least one of the components 702 and 703 is implemented at least in part as software stored in a memory (such as the memory 242). For example, portions of one or more of the components 702 and 703 can be implemented as non-transitory instructions or code executable by a processor (such as the controller 240) to perform the functions or operations of the respective component.

One or more of the components 702 and 703 illustrated in the communication manager 710 may configure the controller 280 to carry out one or more procedures relating to wireless communication by the base station 700, as previously described. For example, the transmission logic 702 may configure the controller 280 to carry out operations that include transmitting a single message that indicates a first transmission opportunity for transmission of information from a UE to a second UE and that indicates one or more additional transmission opportunities for at least one subsequent transmission of information from the UE to the second UE in any manner previously described, such as with reference to block 502 of FIG. 5. Additionally, the receiving logic 704 may configure the controller 280 to carry out operations that include, after transmission of the information to the second UE in the first transmission opportunity, receiving an indication as to whether retransmission of the information in the one or more additional transmission opportunities from the UE to the second UE was successful in any manner previously described, such as with reference to block 504 of FIG. 5. The base station 700 may receive signals from or transmit signals to one or more UEs, such as the UE 115 of FIGS. 1-2, the UEs 404, 406, or 408 of FIG. 4, or the UE 600 of FIG. 6.

It is noted that one or more blocks (or operations) described with reference to FIGS. 1-7 may be combined with one or more blocks (or operations) described with reference to another of the figures. For example, one or more blocks (or operations) of FIG. 3 may be combined with one or more blocks (or operations) of FIG. 5. As another example, one or more blocks associated with FIG. 6 or 7 may be combined with one or more blocks (or operations) associated with FIG. 1 or 2.

Techniques for sidelink resource allocation and communication may include additional aspects, such as any single aspect or any combination of aspects described below or in connection with one or more other processes described elsewhere herein.

In a first aspect, techniques for sidelink resource allocation and communication may include a UE receiving, from a base station, a single message that indicates a first transmission opportunity for transmission of information from the UE to a second UE and that indicates one or more additional transmission opportunities for at least one subsequent transmission of information from the UE to the second UE. Techniques for sidelink resource allocation and communication may also include a UE transmitting the information to the second UE in the first transmission opportunity. Techniques for sidelink resource allocation and communication may further include the UE retransmitting the information to the second UE in at least one of the one or more additional transmission opportunities responsive to the transmission of the information in the first transmission opportunity being unsuccessful.

In a second aspect, in combination with the first aspect, the UE may transmit, to the base station, an indication as to whether retransmission of the information to the second UE was successful after each respective transmission opportunity of the one or more additional transmission opportunities has occurred.

In a third aspect, in combination with one or more of the first and second aspects, the UE may transmit, to the base station, an indication as to whether retransmission of the information to the second UE was successful after a group of transmission opportunities of the one or more additional transmission opportunities has occurred.

In a fourth aspect, in combination with one or more of the first through third aspects, the UE may transmit, to the base station, an indication as to whether retransmission of the information to the second UE was successful after all of the one or more additional transmission opportunities have occurred.

In a fifth aspect, in combination with one or more of the second through fourth aspects, the UE does not transmit the indication during a time period after the first transmission opportunity and before the retransmission of the information in any of the one or more additional transmission opportunities.

In a sixth aspect, in combination with one or more of the first through fifth aspects, the single message further includes an indication as to whether the UE is to indicate whether retransmission of the information to the second UE was successful after each respective transmission opportunity of the one or more additional transmission opportunities has occurred.

In a seventh aspect, in combination with one or more of the first through sixth aspects, the single message further includes an indication as to whether the UE is to indicate whether retransmission of the information to the second UE was successful after a group of transmission opportunities of the one or more additional transmission opportunities has occurred.

In an eighth aspect, in combination with the seventh aspects, the group of transmission opportunities is a subset of all of the one or more additional transmission opportunities.

In a ninth aspect, in combination with one or more of the sixth through eighth aspects, the single message further includes an indication as to whether the UE is to indicate whether retransmission of the information to the second UE was successful after all of the one or more additional transmission opportunities have occurred.

In a tenth aspect, in combination with one or more of the first through ninth aspects, the UE does not receive, from the base station and after the first transmission opportunity and before the retransmission of the information in any of the one or more additional transmission opportunities, an indication of the one or more additional transmission opportunities to use for retransmission of the information.

In an eleventh aspect, in combination with one or more of the first through tenth aspects, the UE does not transmit additional information to the second UE in at least one of the one or more additional transmission opportunities not used for the retransmission of the information to the second UE.

In a twelfth aspect, in combination with one or more of the first through eleventh aspects, the UE may transmit, to the base station, an indication that retransmission of the information to the second UE was successful.

In a thirteenth aspect, in combination with the twelfth aspect, the UE may refrain, based on receiving the indication, from transmitting additional information to the second UE in the at least one of the one or more additional transmission opportunities not used for the retransmission of the information to the second UE.

In a fourteenth aspect, in combination with one or more of the first through thirteenth aspects, the UE may receive, from the base station, an indication that at least one of the one or more additional transmission opportunities not used for the retransmission of the information to the second UE is no longer available for use by the UE.

In a fifteenth aspect, in combination with the fourteenth aspect, the UE may refrain from transmitting additional information to the second UE in at least one of the one or more additional transmission opportunities not used to retransmit the information to the second UE based on the reception of the indication that at least one of the one or more additional transmission opportunities not used to retransmit the information to the second UE are no longer available for use by the UE.

In a sixteenth aspect, in combination with one or more of the first through fifteenth aspects, the UE may transmit additional information in at least one of the one or more additional transmission opportunities not used for retransmission of the information to the second UE.

In a seventeenth aspect, in combination with the sixteenth aspect, the additional information is transmitted to at least one of the second UE, one or more UEs other than the UE and the second UE, or one or more UEs reachable by the UE using a same transmission beam used to transmit information to the second UE.

In an eighteenth aspect, in combination with one or more of the first through seventeenth aspects, the UE may transmit, to the second UE or another UE, control information that indicates how at least one of the one or more additional transmission opportunities not used for retransmission of the information to the second UE is to be used to transmit additional information.

In a nineteenth aspect, in combination with the eighteenth aspect, the control information is transmitted in at least another one of the one or more additional transmission opportunities not used for retransmission of the information to the second UE.

In a twentieth aspect, in combination with one or more of the first through nineteenth aspects, the UE may receive, from the second UE or another UE, information in at least one of the one or more additional transmission opportunities not used for retransmission of the information to the second UE.

In a twenty-first aspect, techniques for sidelink resource allocation and communication may include a base station transmitting, to a UE, a single message that indicates a first transmission opportunity for transmission of information from the UE to a second UE and that indicates one or more additional transmission opportunities for at least one subsequent transmission of information from the UE to the second UE. Techniques for sidelink resource allocation and communication may also include the base station, after transmission of the information to the second UE in the first transmission opportunity, receiving, from the UE, an indication as to whether retransmission of the information in the one or more additional transmission opportunities from the UE to the second UE was successful.

In a twenty-second aspect, in combination with the twenty-first aspect, the base station may receive the indication as to whether retransmission of the information from the UE to the second UE was successful after each respective transmission opportunity of the one or more additional transmission opportunities has occurred.

In a twenty-third aspect, in combination with the twenty-first or twenty-second aspects, the base station may receive the indication as to whether retransmission of the information from the UE to the second UE was successful after a group of transmission opportunities of the one or more additional transmission opportunities has occurred.

In a twenty-fourth aspect, in combination with one or more of the twenty-first through twenty-third aspects, the base station may receive the indication as to whether retransmission of the information from the UE to the second UE was successful after all of the one or more additional transmission opportunities have occurred.

In a twenty-fifth aspect, in combination with one or more of the twenty-second through twenty-fourth aspects, the base station does not receive the indication during a time period after the first transmission opportunity and before a retransmission of the information in any of the one or more additional transmission opportunities.

In a twenty-sixth aspect, in combination with one or more of the twenty-first through twenty-fifth aspects, the single message further includes an indication as to whether the UE is to indicate whether retransmission of the information from the UE to the second UE was successful after each respective transmission opportunity of the one or more additional transmission opportunities has occurred.

In a twenty-seventh aspect, in combination with one or more of the twenty-first through twenty-sixth aspects, the single message further includes an indication as to whether the UE is to indicate whether retransmission of the information from the UE to the second UE was successful after a group of transmission opportunities of the one or more additional transmission opportunities has occurred.

In a twenty-eighth aspect, in combination with the twenty-seventh aspects, the group of transmission opportunities is a subset of all of the one or more additional transmission opportunities.

In a twenty-ninth aspect, in combination with one or more of the twenty-sixth through twenty-eighth aspects, the single message further includes an indication as to whether the UE is to indicate whether retransmission of the information from the UE to the second UE was successful after all of the one or more additional transmission opportunities have occurred.

In a thirtieth aspect, in combination with one or more of the twenty-first through twenty-ninth aspects, the base station does not transmit, to the UE and after the first transmission opportunity and before the retransmission of the information in any of the one or more additional transmission opportunities, an indication of the one or more additional transmission opportunities to use for retransmission of the information.

In a thirty-first aspect, in combination with one or more of the twenty-first through thirtieth aspects, the base station may transmit, to the UE, an indication that at least one of the one or more additional transmission opportunities not used for retransmission of the information from the UE to the second UE are no longer available for use by the UE.

In a thirty-second aspect, in combination with one or more of the twenty-first through thirty-first aspects, the base station may transmit, to the second UE, a single message that indicates a first reception opportunity for reception of information by the second UE from the UE and that indicates one or more additional reception opportunities for at least one subsequent reception of the information by the second UE from the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, processes, or interactions that are described herein are merely examples and that the components, processes, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
   receiving, from a base station, a single message that indicates a first transmission opportunity for transmission of information from the UE to a second UE and that indicates one or more additional transmission opportunities for at least one subsequent transmission of information from the UE to the second UE;
   transmitting the information to the second UE in the first transmission opportunity; and
   retransmitting the information to the second UE in at least one of the one or more additional transmission opportunities responsive to the transmission of the information in the first transmission opportunity being unsuccessful.

2. The method of claim 1, further comprising transmitting, to the base station, an indication as to whether retransmission of the information to the second UE was successful after:
   each respective transmission opportunity of the one or more additional transmission opportunities has occurred;
   a group of transmission opportunities of the one or more additional transmission opportunities has occurred; or
   all of the one or more additional transmission opportunities have occurred.

3. The method of claim 1, wherein the single message further includes an indication as to whether the UE is to indicate whether retransmission of the information to the second UE was successful after:
   each respective transmission opportunity of the one or more additional transmission opportunities has occurred;
   a group of transmission opportunities of the one or more additional transmission opportunities has occurred; or
   all of the one or more additional transmission opportunities have occurred.

4. The method of claim 1, wherein the UE does not transmit additional information to the second UE in at least one of the one or more additional transmission opportunities not used for the retransmission of the information to the second UE.

5. The method of claim 1, further comprising:
   transmitting, to the base station, an indication that retransmission of the information to the second UE was successful;
   receiving, from the base station, an indication that at least one of the one or more additional transmission opportunities not used for the retransmission of the information to the second UE is no longer available for use by the UE; and
   refraining, based on receiving the indication, from transmitting additional information to the second UE in the at least one of the one or more additional transmission opportunities not used for the retransmission of the information to the second UE.

6. The method of claim 1, further comprising transmitting additional information in at least one of the one or more additional transmission opportunities not used for retransmission of the information to the second UE, wherein the additional information is transmitted to at least one of:
   the second UE;
   one or more UEs other than the UE and the second UE; or
   one or more UEs reachable by the UE using a same transmission beam used to transmit information to the second UE.

7. The method of claim 1, further comprising transmitting, to the second UE or another UE, control information that indicates how at least one of the one or more additional transmission opportunities not used for retransmission of the information to the second UE is to be used to transmit additional information.

8. The method of claim 1, further comprising receiving, from the second UE or another UE, information in at least one of the one or more additional transmission opportunities not used for retransmission of the information to the second UE.

9. A user equipment (UE), comprising:
at least one processor; and
at least one memory communicatively coupled with the at least one processor and storing processor-readable code that, when executed by the at least one processor in conjunction with at least one modem, is configured to:
receive, from a base station, a single message that indicates a first transmission opportunity for transmission of information from the UE to a second UE and that indicates one or more additional transmission opportunities for at least one subsequent transmission of information from the UE to the second UE;
initiate transmission of the information to the second UE in the first transmission opportunity; and
retransmit the information to the second UE in at least one of the one or more additional transmission opportunities responsive to the transmission of the information in the first transmission opportunity being unsuccessful.

10. The UE of claim 9, the at least one memory further storing processor-readable code that, when executed by the at least one processor in conjunction with the at least one modem, is configured to transmit, to the base station, an indication as to whether retransmission of the information to the second UE was successful after:
each respective transmission opportunity of the one or more additional transmission opportunities has occurred;
a group of transmission opportunities of the one or more additional transmission opportunities has occurred; or
all of the one or more additional transmission opportunities have occurred.

11. The UE of claim 9, wherein the single message further includes an indication as to whether the UE is to indicate whether retransmission of the information to the second UE was successful after:
each respective transmission opportunity of the one or more additional transmission opportunities has occurred;
a group of transmission opportunities of the one or more additional transmission opportunities has occurred; or
all of the one or more additional transmission opportunities have occurred.

12. The UE of claim 9, wherein the UE does not transmit additional information to the second UE in at least one of the one or more additional transmission opportunities not used for the retransmission of the information to the second UE.

13. The UE of claim 9, the at least one memory further storing processor-readable code that, when executed by the at least one processor in conjunction with the at least one modem, is configured to:
transmit, to the base station, an indication that retransmission of the information to the second UE was successful;
receive, from the base station, an indication that at least one of the one or more additional transmission opportunities not used for the retransmission of the information to the second UE are no longer available for use by the UE; and
refrain, based on receipt of the indication, from transmitting additional information to the second UE in the at least one of the one or more additional transmission opportunities not used for the retransmission of the information to the second UE.

14. The UE of claim 9, the at least one memory further storing processor-readable code that, when executed by the at least one processor in conjunction with the at least one modem, is configured to transmit additional information in at least one of the one or more additional transmission opportunities not used for retransmission of the information to the second UE, wherein the additional information is transmitted to at least one of:
the second UE;
one or more UEs other than the UE and the second UE; or
one or more UEs reachable by the UE using a same transmission beam used to transmit information to the second UE.

15. The UE of claim 9, the at least one memory further storing processor-readable code that, when executed by the at least one processor in conjunction with the at least one modem, is configured to transmit, to the second UE or another UE, control information that indicates how at least one of the one or more additional transmission opportunities not used for retransmission of the information to the second UE is to be used to transmit additional information.

16. A method for wireless communication performed by a base station, the method comprising:
transmitting, to a user equipment (UE), a single message that indicates a first transmission opportunity for transmission of information from the UE to a second UE and that indicates one or more additional transmission opportunities for at least one subsequent transmission of information from the UE to the second UE; and
after transmission of the information to the second UE in the first transmission opportunity, receiving, from the UE, an indication as to whether retransmission of the information in the one or more additional transmission opportunities from the UE to the second UE was successful.

17. The method of claim 16, wherein the indication as to whether retransmission of the information from the UE to the second UE was successful is received after:
each respective transmission opportunity of the one or more additional transmission opportunities has occurred;
a group of transmission opportunities of the one or more additional transmission opportunities has occurred; or
all of the one or more additional transmission opportunities have occurred.

18. The method of claim 17, wherein the base station does not receive the indication during a time period after the first transmission opportunity and before a retransmission of the information in any of the one or more additional transmission opportunities.

19. The method of claim 16, wherein the single message further includes an indication as to whether the UE is to indicate whether retransmission of the information from the UE to the second UE was successful after each respective transmission opportunity of the one or more additional transmission opportunities has occurred.

20. The method of claim 16, wherein the single message further includes an indication as to whether the UE is to indicate whether retransmission of the information from the UE to the second UE was successful after:
a group of transmission opportunities of the one or more additional transmission opportunities has occurred; or all of the one or more additional transmission opportunities have occurred.

21. The method of claim 16, wherein the base station does not transmit, to the UE and after the first transmission opportunity and before the retransmission of the information in any of the one or more additional transmission opportunities, an indication of the one or more additional transmission opportunities to use for retransmission of the information.

22. The method of claim 16, further comprising transmitting, to the UE, an indication that at least one of the one or more additional transmission opportunities not used for the retransmission of the information from the UE to the second UE are no longer available for use by the UE.

23. The method of claim 16, further comprising transmitting, to the second UE, a single message that indicates a first reception opportunity for reception of information by the second UE from the UE and that indicates one or more additional reception opportunities for at least one subsequent reception of the information by the second UE from the UE.

24. A base station, comprising:
at least one processor; and
at least one memory communicatively coupled with the at least one processor and storing processor-readable code that, when executed by the at least one processor in conjunction with at least one modem, is configured to:
transmit, to a user equipment (UE), a single message that indicates a first transmission opportunity for transmission of information from the UE to a second UE and that indicates one or more additional transmission opportunities for at least one subsequent transmission of information from the UE to the second UE; and
after transmission of the information to the second UE in the first transmission opportunity, receive, from the UE, an indication as to whether retransmission of the information in the one or more additional transmission opportunities from the UE to the second UE was successful.

25. The base station of claim 24, wherein the indication as to whether retransmission of the information from the UE to the second UE was successful is received after:

each respective transmission opportunity of the one or more additional transmission opportunities has occurred;
a group of transmission opportunities of the one or more additional transmission opportunities has occurred; or
all of the one or more additional transmission opportunities have occurred.

26. The base station of claim 24, wherein the base station does not receive the indication during a time period after the first transmission opportunity and before a retransmission of the information in any of the one or more additional transmission opportunities.

27. The base station of claim 24, wherein the single message further includes an indication as to whether the UE is to indicate whether retransmission of the information from the UE to the second UE was successful after each repsective transmission opportunities of the one or more additional transmission opportunities has occurred.

28. The base station of claim 24, wherein the single message further includes an indication as to whether the UE is to indicate whether retransmission of the information from the UE to the second UE was successful after:
a group of transmission opportunities of the one or more additional transmission opportunities has occurred; or
all of the one or more additional transmission opportunities has occurred.

29. The base station of claim 28, the at least one memory further storing processor-readable code that, when executed by the at least one processor in conjunction with the at least one modem, is configured to transmit, to the UE, an indication that at least one of the one or more additional transmission opportunities not used for the retransmission of the information from the UE to the second UE are no longer available for use by the UE.

30. The base station of claim 28, the at least one memory further storing processor-readable code that, when executed by the at least one processor in conjunction with the at least one modem, is configured to transmit, to the second UE, a single message that indicates a first reception opportunity for reception of information by the second UE from the UE and that indicates one or more additional reception opportunities for at least one subsequent reception of the information by the second UE from the UE.

\* \* \* \* \*